US011206699B2

(12) United States Patent
Seigel et al.

(10) Patent No.: US 11,206,699 B2
(45) Date of Patent: Dec. 21, 2021

(54) REGISTERING NETWORK DEVICES USING KNOWN HOST DEVICES

(71) Applicant: Quest Software Inc., Aliso Viejo, CA (US)

(72) Inventors: Jake Seigel, Halifax (CA); Derek Jury, Beachville (CA); Sohail Ali, Halifax (CA)

(73) Assignee: QUEST SOFTWARE INC., Aliso Viejo, CA (US)

(*) Notice: Subject to any disclaimer, the term of this patent is extended or adjusted under 35 U.S.C. 154(b) by 609 days.

(21) Appl. No.: 14/964,027

(22) Filed: Dec. 9, 2015

(65) Prior Publication Data

US 2017/0171831 A1 Jun. 15, 2017

(51) Int. Cl.
*H04W 76/11* (2018.01)
*H04W 4/80* (2018.01)

(52) U.S. Cl.
CPC ............. *H04W 76/11* (2018.02); *H04W 4/80* (2018.02)

(58) Field of Classification Search
CPC ... H04W 60/04; H04W 76/021; H04W 76/11; H04W 4/80
See application file for complete search history.

(56) References Cited

U.S. PATENT DOCUMENTS

| | | | |
|---|---|---|---|
| 8,887,262 B1* | 11/2014 | Turner | H04L 63/0853 709/220 |
| 9,173,155 B2* | 10/2015 | Kamalaraj | H04W 8/065 |
| 2012/0019365 A1* | 1/2012 | Tuikka | G06Q 30/02 340/10.1 |
| 2013/0309971 A1* | 11/2013 | Kiukkonen | H04L 63/107 455/41.2 |
| 2015/0112774 A1* | 4/2015 | Georgoff | G06Q 30/0207 705/14.1 |
| 2016/0087933 A1* | 3/2016 | Johnson | H04W 4/001 709/245 |
| 2016/0192141 A1* | 6/2016 | Park | H04W 4/023 455/456.3 |
| 2017/0063846 A1* | 3/2017 | Mohamad Abdul | G06F 8/60 |

* cited by examiner

*Primary Examiner* — Asghar H Bilgrami
(74) *Attorney, Agent, or Firm* — Kirton McConkie; Brian Tucker (57) ABSTRACT

Network devices can be registered to access a network using known host devices to thereby simplify the device registration process. The host device can be an administrator's device that is already registered and authorized to vouch for another user desiring to register his or her device. Alternatively, the host device can be the user's previously registered device and can be used to register the user's additional devices.

20 Claims, 5 Drawing Sheets

REGISTERING NETWORK DEVICES USING KNOWN HOST DEVICES

CROSS-REFERENCE TO RELATED APPLICATIONS

N/A

BACKGROUND

The present invention is generally directed to registering devices as part of allowing the devices to access a network. Many organizations provide wireless or wired network interfaces through which devices may obtain access to the internet or other network resources. A common example is when a company or university provides a Wi-Fi network through which its employees and/or students may access the internet.

In this specification, an entity that maintains and provides access to a network will be referred to as a "network provider." An individual desiring to use his or her device to access the network will be referred to as a "user."

A network provider may require a device to register before obtaining network access for a number of reasons. For example, the network provider may desire to limit network access to selected users (e.g., employees and authorized guests). Also, the network provider may desire to monitor network traffic and have a way to attribute improper network traffic to a particular user.

Currently, there are various options for registering a device. In most cases, a network provider will implement a browser-based registration process which requires the user to provide appropriate input into a browser on the device that the user desires to register. For example, upon connecting a device to a network access point (e.g., via Wi-Fi, Ethernet, or other protocol) and opening a browser on the device, a webpage can be displayed that prompts the user to input a username and password. Then, the network provider would typically store the username in association with the device's MAC address (which could have been obtained when the device connected or communicated via Wi-Fi, Ethernet, or another protocol) so that the network provider can know that any network traffic associated with the MAC address is also associated with the user.

A network provider may also provide a manual registration process which may typically be used when a device does not have a browser. With manual registration, the user (or another individual) is typically required to employ a separate device that has a browser to manually input the device's MAC address, the user's username, and any other requested information. The network provider can then create the association between the manually input MAC address and username so that any network traffic associated with the MAC address can be attributed to the user.

As more and more organizations move to a "bring your own device" model, device registration has become a time-consuming process. This is true even when the personal devices have browsers that allow them to be registered via a browser-based registration process since an administrator may still be required to inform users of and assist them with the process. Further, it is common for users to carry a number of different devices that they desire to connect to the network (e.g., smart phones and tablets). Also, increasingly more of these additional devices lack a browser such that manual device registration would be required.

BRIEF SUMMARY

The present invention extends to methods, systems, and computer program products for registering network devices using known host devices. The present invention can be implemented to simplify the device registration process. The host device can be an administrator's device that is already registered and authorized to vouch for another user desiring to register his or her device. Alternatively, the host device can be the user's previously registered device and can be used to register the user's additional devices.

To allow the host device to register another device, the host device and other device can be configured to communicate wirelessly. For example, the device to be registered can be configured to transmit its MAC address (or other device identifier) to the host device via Near Field Communication, Bluetooth, or another wireless protocol. In embodiments where the host device is an administrator's device, in conjunction with receiving the device's identifier, the administrator can input an identifier of the user (e.g., a username) so that the appropriate association can be created between the device and the user. Similarly, in embodiments where the host device is the user's previously registered device, the host device can be configured to employ the user's identifier when registering any additional devices.

With this approach, a user can register a first device by visiting the administrator. Then, if the user desires to register any of his or her other devices, he or she can do so using the first device without needing to again visit the administrator. Therefore, the present invention can simplify the process of registering a user's first device (e.g., by employing a wireless protocol to communicate the device identifier to the host device) as well as the process of registering a user's additional devices (e.g., by allowing the user to employ the first device to perform the registration process).

In one embodiment, the present invention is implemented as a method for registering a user device to access a network via a known host device. An interface can be provided on a known host device to allow a user device to be registered to access a network. Input that identifies an identifier of a user of the user device can be received via the interface. An identifier of the user device can also be received from the user device via a direct wireless communication protocol. The user identifier and the identifier of the user device can then be transmitted to a device management system to enable the device management system to associate the user identifier with the identifier of the user device for the purpose of attributing the user device's network traffic to the user.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
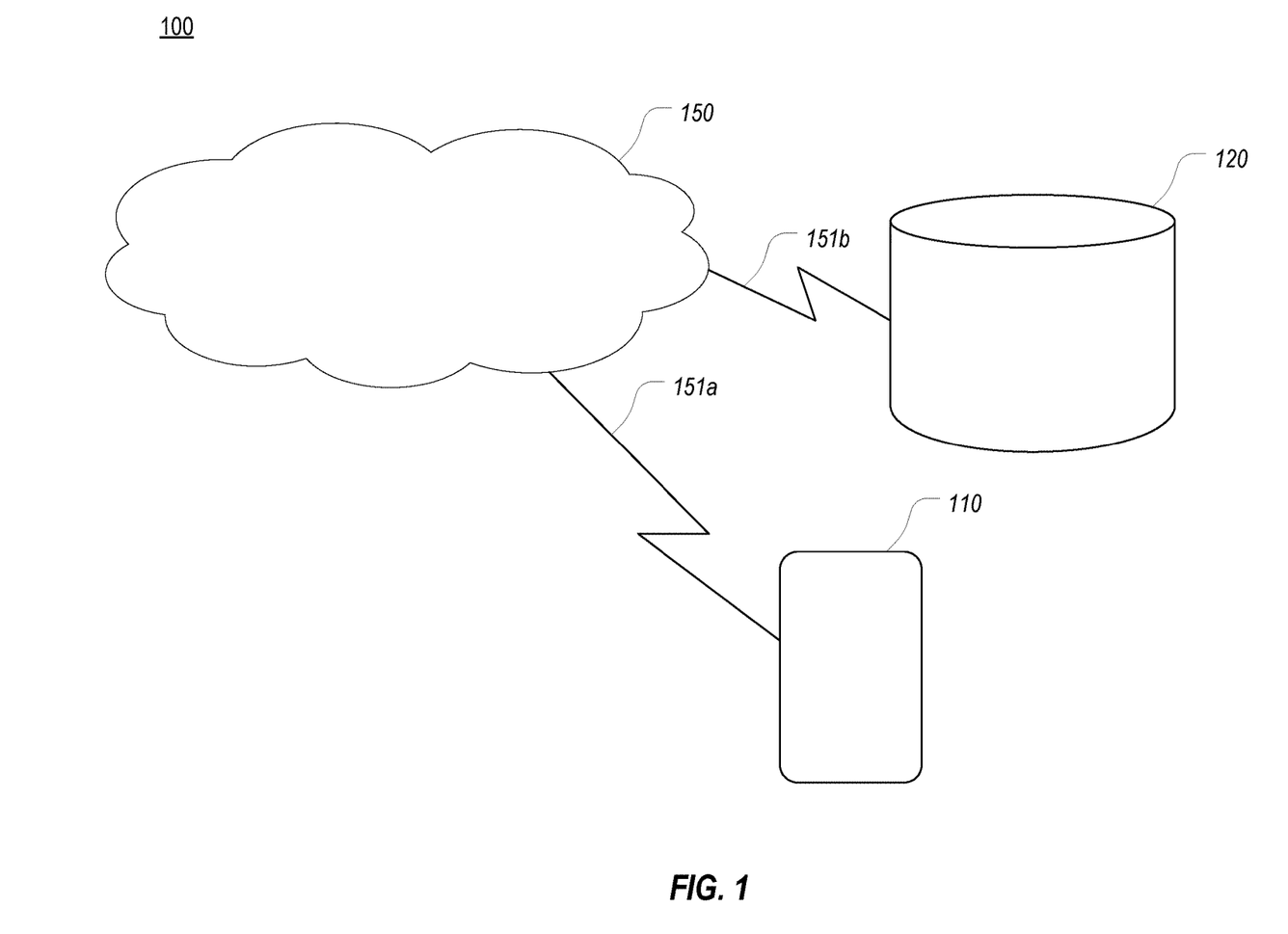
FIG. 1 illustrates an example computing environment in which the present invention can be implemented.

FIG. 1 illustrates an example computing environment 100 in which the present invention can be implemented. Computing environment 100 includes an administrator device 110 and a device management system 120 which are both connected to a network 150 via connections 151a, 151b respectively. Network 150 can generally represent any type of network and its components. For purposes of the present disclosure, it will be assumed that network 150 provides one or more wireless access points (e.g., a Wi-Fi router) for allowing users to connect their devices to network 150. However, network 150 may also provide one or more wired access points.

Device management system 120 can represent any type of system known in the art to manage a device's access to network resources. In FIG. 1, device management system 120 is represented as a database to indicate that the system maintains a record of which devices are registered to access network 150. For example, as indicated in the Background, device management system 120 can maintain associations between a user identifier and a registered device's identifier. In the examples in this specification, a device's MAC address and a user's username will be described as being used to create such associations. However, the present invention can also be implemented when a different type of device identifier and/or user identifier is employed.

Administrator device 110 is represented as a mobile device (e.g., a smart phone or tablet) in FIG. 1. However, administrator device 110 can represent any type of computing device that is capable of performing the functions that will be described below. Employing a mobile device as administrator device 110 is preferred in many embodiments since it facilitates device registration in a variety of locations as will become apparent in the description below.

In FIG. 1, it will be assumed that administrator device 110 has already been registered to access network 150. For example, if the provider of network 150 is a company, an employee of the company can be selected as an administrator tasked with managing the device registration process. In such cases, administrator device 110 can represent the computing device used by the administrator for device registration purposes, and device management system 120 can include an association between the administrator's username and the MAC address of administrator device 110.

As part of this registration, device management system 120 can authorize administrator device 110 to register other devices. In other words, administrator device 110 can be registered as a "known host device." For example, administrator device 110 may include a registration application (e.g., a mobile app) that is configured to communicate with device management system 120 for the purpose of registering other devices. Accordingly, whenever a user desires to register his or her device to access network 150, the user can visit the administrator who will then employ administrator device 110 to register the user's device. To ensure the integrity of the registration process, the registration application may require the administrator to authenticate with proper credentials prior to being able to register devices.

Figure 2:
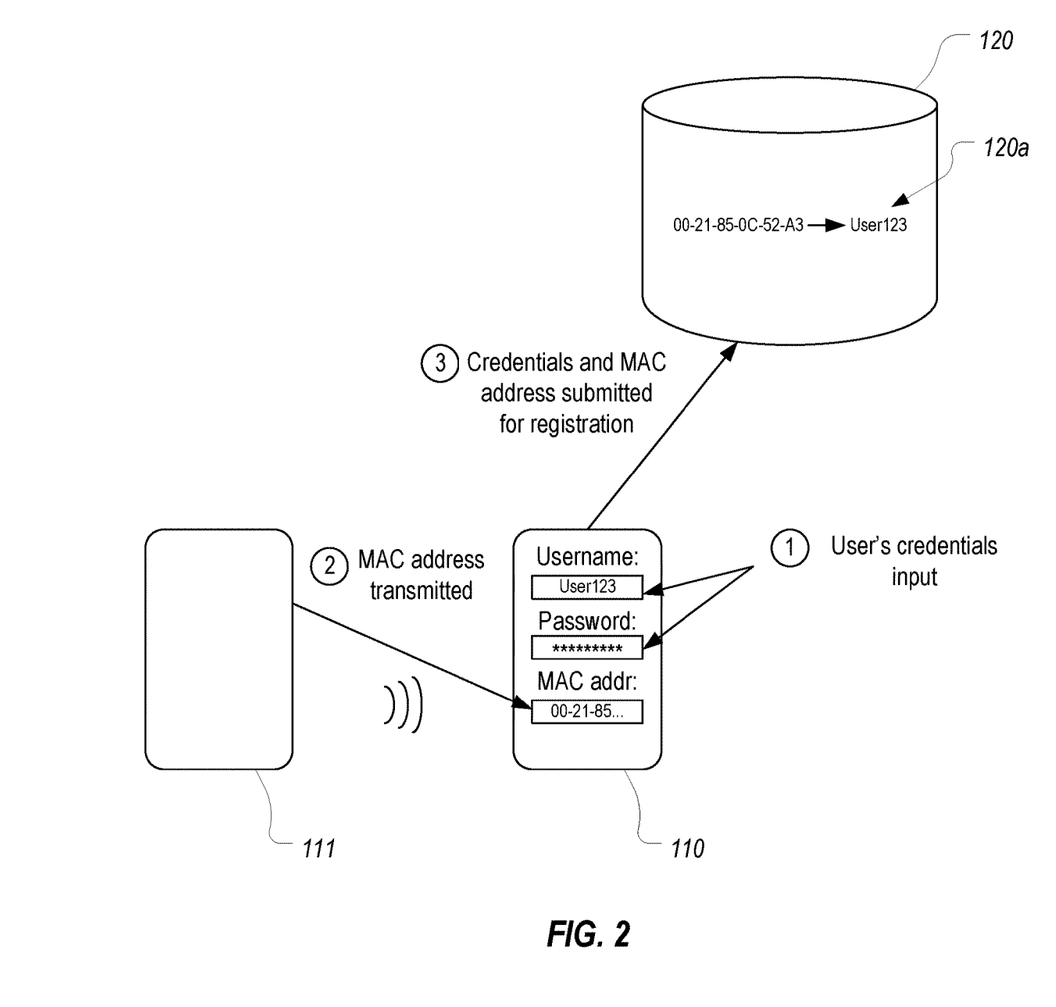
FIG. 2 illustrates a process for registering a user device to access a network via a known host device.

FIG. 2 provides a representation of the process of employing administrator device 110 to register another user's device. As shown, a user has brought a user device 111 in proximity to administrator device 110 and has requested that the administrator register user device 110. In response, in step 1, the administrator can ask the user to input the user's credentials (e.g., a username of User123 and a password) into the registration application. Alternatively, the administrator could input the user's username and/or password. Inputting the user's credentials should be construed broadly to encompass implementations where the user's credentials (or identifier) are already known to administrator device 110. For example, if the network provider were a hotel, the user may have already made a registration and therefore administrator device 110 may already store an identifier of the user. In such cases, the user identifier may only need to be selected as part of the registration process. In contrast, if the network provider is an employer, the administrator may not know a user's username and can therefore ask the user to input it.

In step 2 (which could equally be performed prior to step 1), the registration application can be configured to cause administrator device 110 to communicate directly with user device 111 to obtain user device 111's MAC address which in this case is assumed to be 00-21-85-0C-52-A3. For example, NFC, RFID, Bluetooth, or another wireless protocol that allows direct communication between devices 110 and 111 when in close proximity (i.e., not via network 150) can be employed. Accordingly, administrator device 110 obtains user device 111's MAC address without requiring the user (or the administrator) to determine what the MAC address is—which is something that many users do not know how to do.

Finally, in step 3, administrator device 110 submits the user's credentials and user device 111's MAC address to device management system 120 to register user device 111 to access network 150. Device management system 120 can store the association 120a of the username (User123) and MAC address (00-21-85-0C-52-A3) so that any network traffic associated with the MAC address can be attributed to the user.

It is noted that this process can be performed prior to or after the user has connected user device 111 to a wireless access point of network 150. For example, the user may have already established a Wi-Fi connection with network 150 prior to approaching the administrator to register user device 111. In such cases, the network 150 may block communications received from user device 111 until the registration process has been completed (i.e., until such communications can be associated with the user).

In some embodiments, once user device 111 has been registered, device management system 120 may allow user device 111 to function as a known host device for the purpose of registering other user devices. However, in such cases, user device 111 would be limited to registering only his or her additional devices (or at least limited to associating another device only with his or her username).

Figure 3:
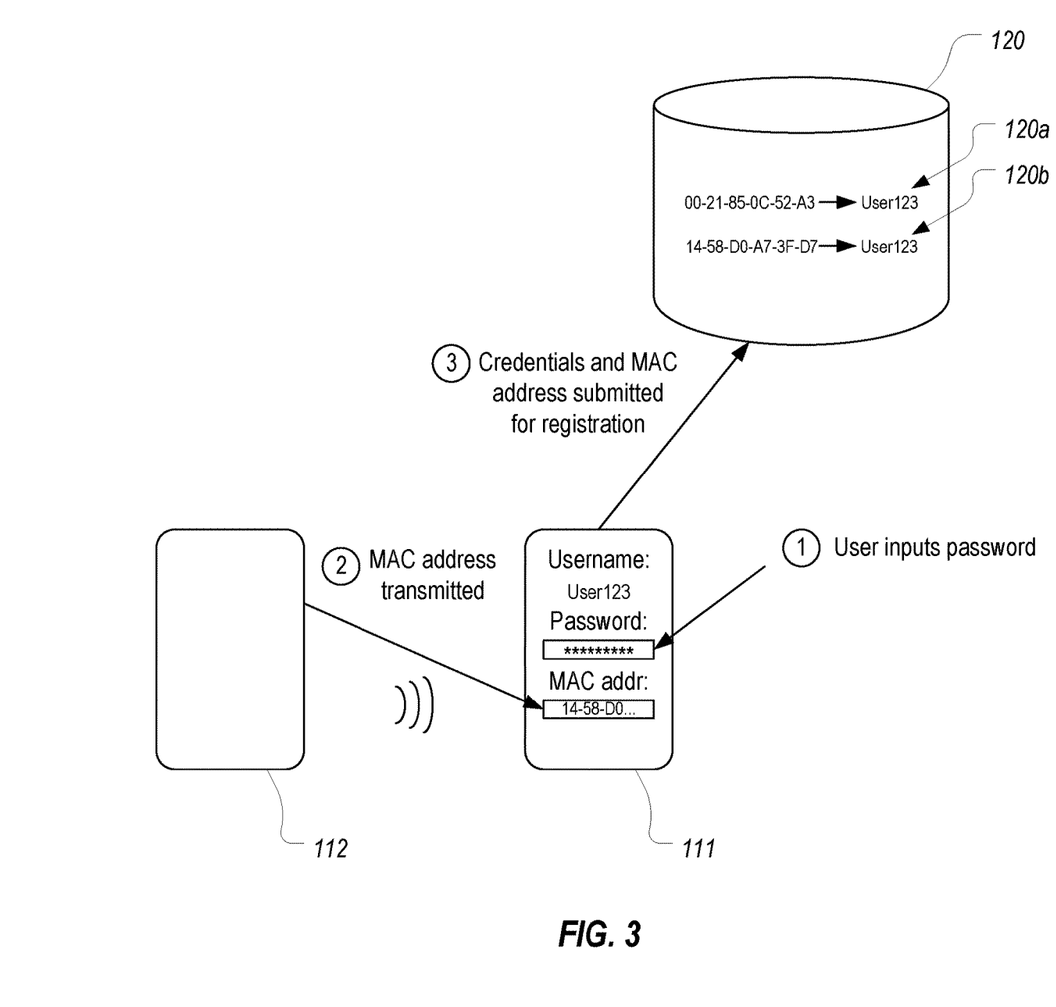
FIG. 3 illustrates a process for registering an additional user device to access the network via a previously registered user device.

FIG. 3 illustrates an example of how user device 111 could be used to register another user device. To facilitate employing user device 111 to register another user device, the network provider may provide a registration application (e.g., a mobile app) that the user can install on user device 111. In FIG. 3, it is assumed that user device 111 is the user's smart phone and that the user now desires to register his tablet, user device 112.

As shown, the user has brought user device 112 in close proximity to user device 111. The registration process can then be carried out in much the same manner as described above with reference to FIG. 2. However, because user device 111 is not an administrator device, the user does not have the option to specify a username. Instead, the user's username (which is again User123) is shown as being the only available option.

In step 1, the registration application executing on user device 111 may require the user to input his or her password. This is an optional step that may be required to prevent any other user from improperly registering a device using user device 111. In the same manner as described above, step 2 involves utilizing a direct wireless communication protocol to directly transfer user device 112's MAC address (which is assumed to be 14-58-D0-A7-3F-D7) to user device 111. Then, user device 112's MAC address, the user's username, and optionally the user's password can be submitted to device management system 120. Accordingly, after this process is complete, device management system 120 will store an association 120b between user device 112's MAC address and the user's username. In this way, the user is able to register his tablet without needing to revisit the administrator.

In some embodiments, it may not be desirable to "fully" register a user device in the manners described above. For example, a guest that does not have a user account on network 150 may desire to have temporary access to network 150 from his or her user device. In such cases, administrator device 110 or another known host device (e.g., user device 111 once registered) may be configured to function as a "sponsor" for another user device. When employing a sponsor to access network 150, the "sponsored" user device does not directly access network 150, but uses the "sponsoring" device as an access point (e.g., as a hot spot).

Figure 4:
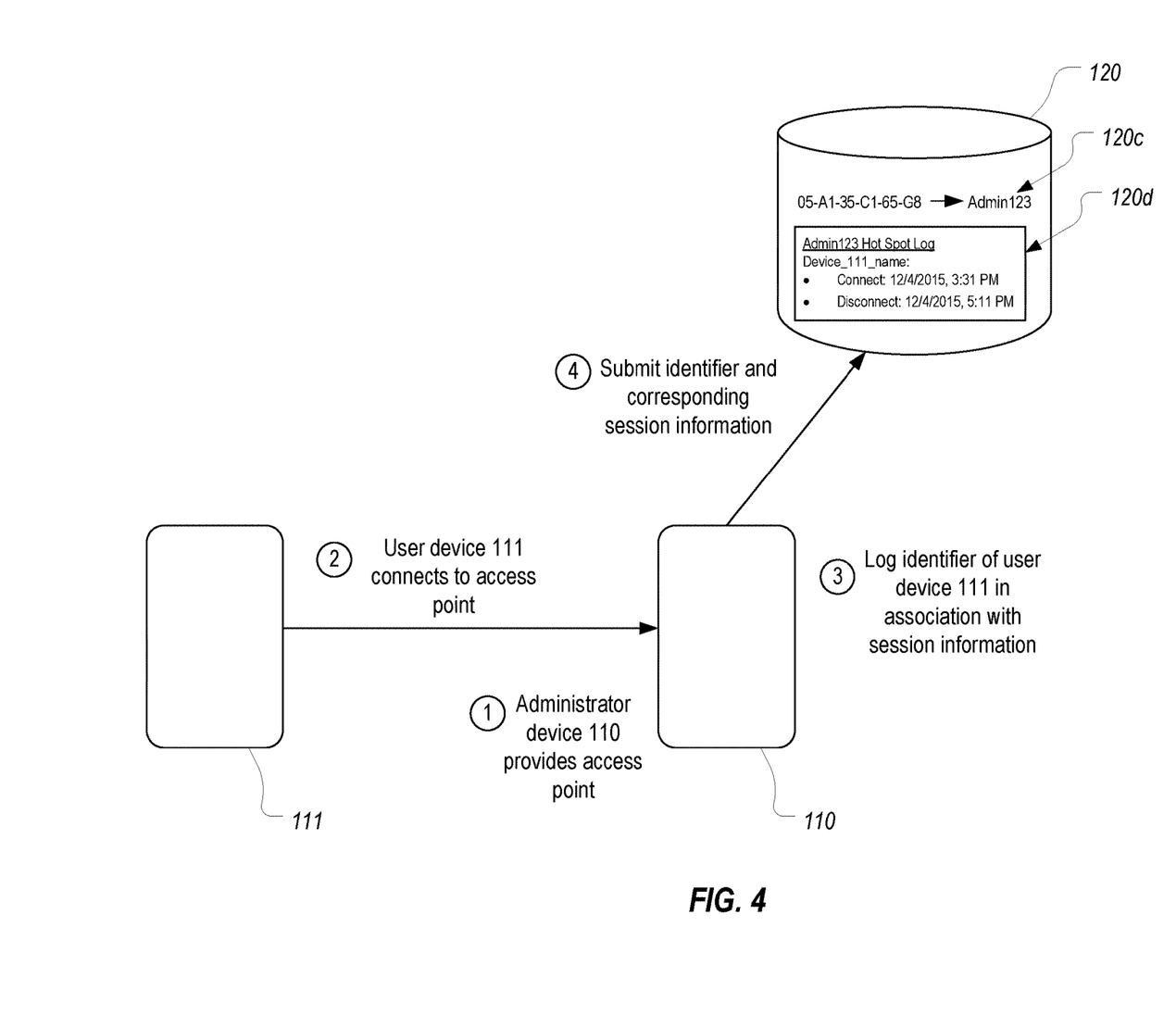
FIG. 4 illustrates a process for sponsoring a user device to enable the user device to access the network.

FIG. 4 provides an example of this type of "sponsored" access where administrator device 110 functions as the sponsoring device and user device 111 functions as the sponsored device. As shown, it is assumed that device management system 120 already stores an association 120c between administrator device 110's MAC address (05-A1-35-C1-65-G8) and the administrator's username (Admin123).

In this scenario and as represented by step 1, administrator device 110 can be configured to provide an access point (e.g., a hot spot) to which other devices may tether to obtain access to network 150. This tethering can be accomplished using Wi-Fi, Bluetooth, USB, or another protocol as is known in the art. In typical embodiments, the administrator could provide the user of user device 111 with a password to establish the connection.

Then, when user device 111 tethers to administrator device 110's access point in step 2, user device 111 will have access to network 150 as is known in the art. However, without any additional action, device management system 120 would be unable to distinguish between network traffic that originated on administrator device 110 and network traffic that originated on user device 111 because, in either case, the network traffic will come from/through administrator device 110.

Therefore, in accordance with embodiments of the present invention, the registration application on administrator device 110 can be configured to maintain a log of any user device that connects to network 150 via administrator device 110. As represented in step 3 of FIG. 4, administrator device 110 can log an identifier of user device 111 once user device 111 has connected. This identifier can be the computer name (or hostname) of user device 111. For example, when a device such as a smart phone is employed as a mobile hot spot and another device connects to the hot spot, the other device's name is typically presented on the hot spot device as a connected device. In such cases, the registration application on administrator device 110 can be configured to log this device name along with an indication of the time period during which user device 111 is connected (i.e., "session information"). In this way, administrator device 110 maintains a log of not only which devices connected via the hot spot, but also a log of when each device was connected.

Therefore, even though user device 111's network traffic will be associated with administrator device 110's MAC address from the perspective of device management system 120, the log maintained on administrator device 110 will still provide a means for potentially attributing improper traffic to user device 111. For example, if device management system 120 were to detect improper traffic that is associated with the administrator (e.g., using association 120c), timing information of the improper traffic could be used to determine whether the improper traffic can be attributed to any user device that was connected at that time. In particular, if the improper traffic was detected at 5:00 PM and the log on administrator device 110 indicates that only user device 111 was connected to the hot spot at 5:00 PM, it can be determined that either user device 111 or administrator device 110 was the source of the improper traffic.

In some embodiments, the registration application on administrator device 110 can be configured to transfer the log (or at least individual device identifiers and corresponding session information (e.g., log 120d shown in FIG. 4)) to device management system 120 for storage as represented by optional step 4 in FIG. 4. In such cases, device management system 120 could determine potential sources of improper traffic without needing to access a log on administrator device 110. However, in most cases, it may be preferred to maintain the log on administrator device 110 so that the administrator, who should have direct knowledge of the users that connected their devices to the hot spot, can be directly consulted to determine the likely source of the improper traffic.

In summary, in each of the described embodiments, the present invention provides a way to more quickly and easily register a device for network access while still retaining the ability to attribute network traffic to a particular device. The present invention can therefore reduce the burden of managing device registration in environments where increasingly more network-capable devices are employed.

Figure 5:
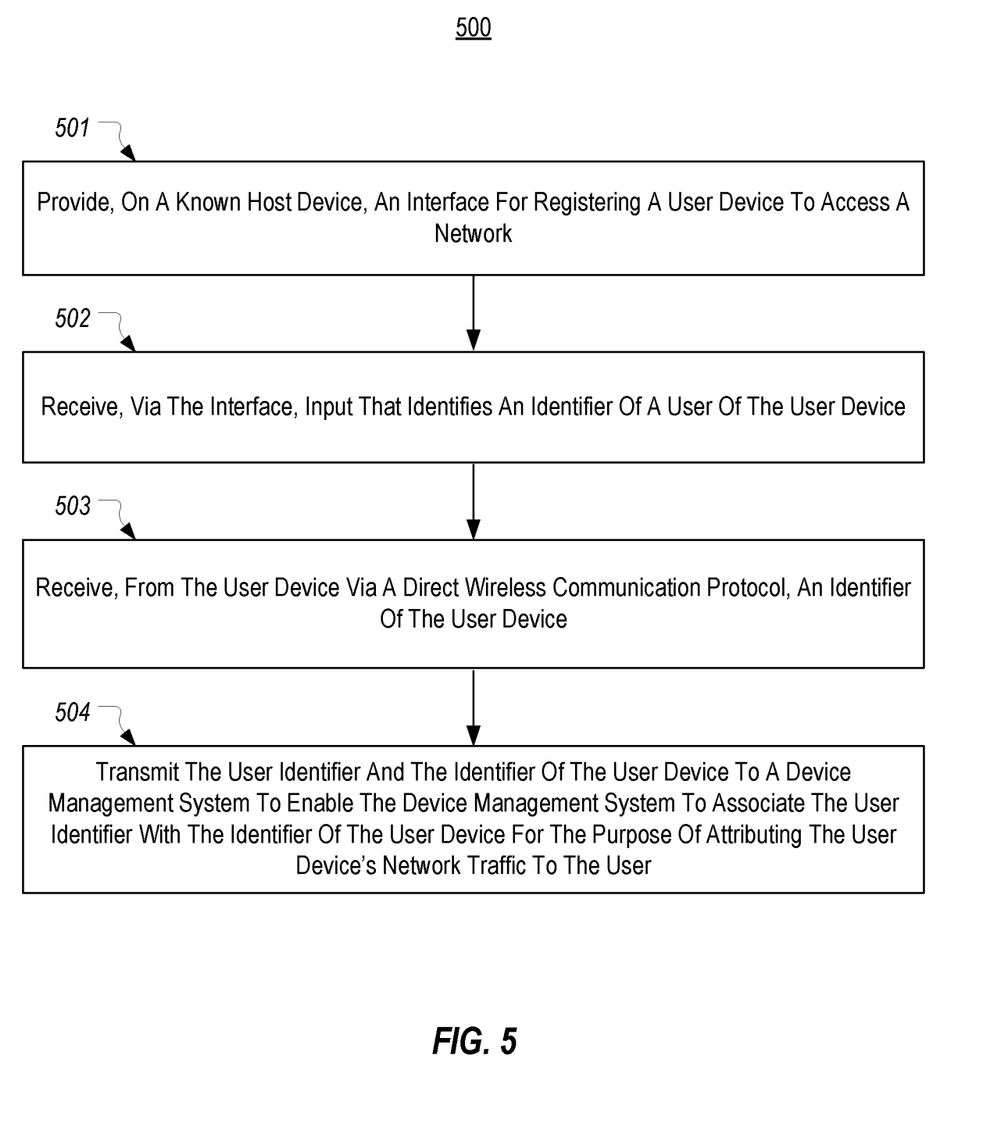
FIG. 5 illustrates a flowchart of an example method for registering a user device to access a network via a known host device.

FIG. 5 provides a flowchart of an example method 500 for registering a user device to access a network via a known host device. Method 500 will be described with reference to FIG. 2.

Method 500 includes an act 501 of providing, on a known host device, an interface for registering a user device to access a network. For example, a registration application may be installed on administrator device 110.

Method 500 includes an act 502 of receiving, via the interface, input that identifies an identifier of a user of the user device. For example, a user desiring to register user device 111 can input his or her username for accessing resources on network 150 into an interface of the registration application executed on administrator device 110.

Method 500 includes an act 503 of receiving, from the user device via a direct wireless communication protocol, an identifier of the user device. For example, the registration application on administrator device 110 can employ Near Field Communication or Bluetooth to obtain a MAC address of user device 111.

Method 500 includes an act 504 of transmitting the user identifier and the identifier of the user device to a device management system to enable the device management system to associate the user identifier with the identifier of the user device for the purpose of attributing the user device's network traffic to the user. For example, the registration application on administrator device 110 can transmit the username and MAC address to device management system 120.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for registering a user device to access a network via a known host device, the method comprising:
   displaying, on a known host device, a user interface for registering a user device to access a network, the known host device being registered to access the network and authorized to register other devices to access the network;
   receiving, by the known host device and via the user interface, input that identifies an identifier of a user of the user device;
   establishing, by the known host device, a direct wireless communication protocol connection with the user device;
   sending, by the known host device and via the direct wireless communication protocol connection, a request for an identifier of the user device;
   receiving, by the known host device and from the user device via the direct wireless communication protocol connection, the identifier of the user device; and
   transmitting, by the known host device, the user identifier that was received via the user interface and the identifier of the user device that was received via the direct wireless communication protocol connection to a device management system to enable the device management system to associate the user identifier with the identifier of the user device for the purpose of attributing the user device's network traffic to the user such that the user device is registered to access the network by virtue of the known host device, which has been registered to access the network and authorized to register other devices to access the network, having transmitted the user identifier and the identifier of the user device to the device management system.

2. The method of claim 1, wherein the direct wireless communication protocol is Near Field Communication.

3. The method of claim 1, wherein the direct wireless communication protocol is Bluetooth.

4. The method of claim 1, wherein the user identifier is a username.

5. The method of claim 1, wherein the identifier of the user device is a MAC address.

6. The method of claim 1, wherein the known host device comprises a device registered to an administrator.

7. The method of claim 1, wherein the known host device and the user device are both mobile devices.

8. The method of claim 1, wherein receiving input that identifies an identifier of a user of the user device comprises receiving the user's username and password.

9. The method of claim 1, further comprising:
   after the user device is registered to access the network, providing, on the user device, an interface for registering one or more additional user devices to access the network using the user identifier;
   establishing, by the user device, a direct wireless communication protocol connection with a first additional user device;
   receiving, from the first additional user device and via the direct wireless communication protocol connection, an identifier of the first additional user device; and
   transmitting the user identifier and the identifier of the first additional user device to the device management system to enable the device management system to associate the user identifier with the identifier of the first additional user device for the purpose of attributing the first additional user device's network traffic to the user.

10. The method of claim 9, wherein the direct wireless communication protocol is one or more of Near Field Communication or Bluetooth.

11. The method of claim 1, further comprising:
providing, by the known host device, an access point for connecting to the network;
logging an identifier of a second user device that connects to the network via the access point; and
storing session information in association with the identifier of the second device, the session information identifying a time period during which the second user device is connected to the network via the access point.

12. The method of claim 11, wherein the identifier of the second user device is a computer name of the second user device.

13. The method of claim 11, further comprising:
transmitting the identifier of the second device and the session information to the device management system for storage in association with a user identifier of a user of the known host device.

14. One or more computer storage media storing computer executable instructions which when executed by one or more processors implement a method for registering a user device to access a network via a known host device, the method comprising:
displaying, on a known host device, a user interface for registering a user device to access a network, the known host device being registered to access the network and authorized to register other devices to access the network;
receiving, by the known host device and via the user interface, a username of a user of the user device;
establishing, by the known host device, a direct wireless communication protocol connection with the user device;
sending, by the known host device and via the direct wireless communication protocol connection, a request for a MAC address of the user device;
receiving, by the known host device and from the user device via the direct wireless communication protocol connection, a MAC address of the user device; and
transmitting, by the known host device, the username that was received via the user interface and MAC address that was received via the direct wireless communication protocol connection to a device management system to enable the device management system to associate the username with the MAC address for the purpose of attributing the user device's network traffic to the user such that the user device is registered to access the network by virtue of the known host device, which has been registered to access the network and authorized to register other devices to access the network, having transmitted the username and MAC address of the user device to the device management system.

15. The computer storage media of claim 14, wherein the direct wireless communication protocol is Near Field Communication.

16. The computer storage media of claim 14, wherein the known host device comprises a device registered to an administrator.

17. A system for registering a user device with a network comprising:
a device management system that includes a database for storing associations between user identifiers and identifiers of user devices that are registered to access the network, the device management system further including one or more network components that are configured to monitor network traffic generated by the user devices; and
a registration application configured to be executed on an administrator device that has been registered to access the network and authorized to register other devices to access the network, the registration application being further configured to communicate with the device management system to register user devices with the device management system, the registration application comprising:
a user interface for receiving manual input of an identifier of a first user of a first user device; and
an interface for requesting and receiving, via a direct wireless communication protocol connection that the administrator device has established with the first user device, an identifier of the first user device;
wherein the registration application is configured to transmit the identifier of the first user that was received via the user interface and the identifier of the first user device that was received via the direct wireless communication protocol connection to the device management system to cause the identifier of the first user to be stored in the database in association with the identifier of the first user device to thereby register the first user device to access the network and to allow the device management system to attribute network traffic generated by the first user device to the first user such that the first user device is registered to access the network by virtue of the registration application on the administrator device, which has been registered to access the network and authorized to register other devices to access the network, having transmitted the identifier of the first user and the identifier of the first user device to the device management system.

18. The system of claim 17, wherein the direct wireless communication protocol is Near Field Communication.

19. The system of claim 17, wherein the identifier of the first user comprises the first user's username that is employed to login to one or more resources on the network.

20. The system of claim 17, wherein the identifier of the first user device is a MAC address of a network card of the first user device.

* * * * *